3,763,132
COMPOSITION COMPRISING CARBOXYL-TERMINATED POLYMERS AND AZIRIDINES

Charles H. Meiser, Jr., Yardley, Pa., assignor to Thiokol Chemical Corporation, Bristol, Pa.
No Drawing. Filed Sept. 9, 1965, Ser. No. 486,209
Int. Cl. C08d 5/02
U.S. Cl. 260—94.7 N                    9 Claims

ABSTRACT OF THE DISCLOSURE

The invention relates to a curable composition comprising carboxyl-containing hydrocarbon polymers, carboxyl-containing halocarbon polymers, carboxyl-containing polyester polymers in admixture with tris[1-(2-methyl)aziridinyl]-phosphine oxide and propylene imine/trimethylol-propane trimethacrylate adduct. These compounds are useful as binders for solid rocket propellants.

---

This invention relates to a method of curing polymeric materials. More particularly, this invention relates to an improved method of curing carboxyl-containing polymeric materials to provide a stable, cured composition resistant to aging at elevated temperatures.

Carboxyl-containing polymers have been conventionally cured using either of two classes of curing agents, imines or epoxy resins. These carboxyl-containing polymers cured with either curing system provide cured resins which are flexible and mechanically strong. However, they do not retain these properties after prolonged storage at relatively high temperatures. For example, under such storage conditions, imine-cured carboxyl-containing polymers degrade, i.e., lose their desirable mechanical properties and become soft. On the other hand, under the same conditions, epoxy-cured carboxyl-containing polymers progressively harden to a brittle state.

Thus, it is an object of this invention to provide a novel curing system for carboxyl-containing polymers.

Another object of the invention is to provide a novel curing system which will produce cured carboxyl-containing polymers which are stable under conditions of elevated temperature.

The objects of the present invention are realized by utilizing a certain mixture of polyfunctional aziridine compounds as a curing system for carboxyl-containing polymers.

Suitable carboxyl-containing polymers are polymers having a hydrocarbon or halocarbon backbone prepared by the polymerization of the unsaturated hydrocarbons or halocarbons using a free radical initiator, such as carboxyl-containing polymers and interpolymers of butadiene, isoprene, methylisoprene, chloroprene, styrene, vinyl chloride, vinyl acetate, vinyl butyrate, vinyl propionate, methyl acrylate, ethyl acrylate, 2-ethyl hexyl acrylate, methyl methacrylate, lauryl methacrylate, stearyl methacrylate, ethyl methacrylate, acrylonitrile, acrylic acid, methacrylic acid, maleic acid, fumaric acid, and itaconic acid. Other suitable carboxyl-containing polymers are carboxyl-terminated linear polyesters formed from glycols and a slight excess of a dicarboxylic acid, e.g., polyesters from adipic acid or azelaic acid and ethylene glycol or diethylene glycol. Still other suitable carboxyl-containing polymers are fluorocarbon polymers and carboxyl-containing polysulfide polymers.

A well known curing agent for carboxyl-containing polymers is tris[1-(2-methyl)aziridinyl] phosphine oxide, MAPO. When MAPO is used as the sole curing agent for carboxyl-containing polymers, the cured resin degrades or becomes soft with time at temperatures above 135° F. and particularly at 200° F. or higher. This degradation is accelerated by the presence of high humidity.

In attempting to compensate for the degradation of carboxyl-containing polymers cured with MAPO alone, polyepoxides, such as N,N-di(2,3-epoxypropyl)-4-(2,3-epoxypropoxy) aniline have been used in combination with MAPO as a curing system for carboxyl-terminated polybutadiene. Although this curing system prevents degradation of the polymer at elevated temperatures, it is unsatisfactory because the crosslinking produced with polyepoxides in time and/or with heat causes the polymer to become hard and brittle. This loss of rubbery characteristics is undesirable.

It has now been unexpectedly found that the use of a combination of MAPO and a certain trifunctional aziridine compound as a curing system for carboxyl-containing polymers will allow for the production of a cured resin which will not undergo the degradation produced using MAPO alone or will not lead to the brittleness produced using a combination of MAPO and a polyepoxide.

The trifunctional aziridine compound useful in the present invention in combination with MAPO has the formula:

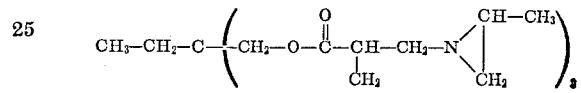

and is known as the propyleneimine adduct of the trimethacrylate ester of trimethylolpropane or propyleneimine/trimethylolpropane trimethacrylate adduct (PI/TMPTMA). It may be prepared by the reaction between propyleneimine and the trimethacrylate ester of trimethylolpropane.

It was found that the propyleneimine/trimethylolpropane trimethacrylate adduct alone, using an imine/carboxyl ratio of 1:1, does not produce a stable cure of carboxyl-terminated polybutadiene and, using an imine/carboxyl ratio of 1.25:1, produces a cured system which becomes hard and brittle after heat aging at elevated temperatures. However, when used in combination with MAPO, as a curing system, it produces a stable cured composition which maintains its rubbery characteristics and does not degrade under prolonged storage at temperatures up to 200° F. and has satisfactory mechanical properties at temperatures as low as −80° F.

According to the present invention, the curing system comprises a mixture of MAPO and the propyleneimine/trimethylolpropane trimethacrylate adduct in a mole ratio of about 5/95 to about 95/5. The preferred ratio is about 50/50. The curing system is added to the carboxyl-containing polymer in an amount calculated so that the ratio of imine groups to carboxyl groups (i.e. the I/A ratio) is about .75/1 to 1.5/1. The preferred ratio is about 1.25/1, because this ratio produces the best physical properties, i.e., high (but not too high) stress values combined with good elongation.

Other polyfunctional aziridine compounds were tried in combination with MAPO as a curing system for carboxyl-terminated polybutadiene polymers but none of them produced the same stabilizing effect as the propyleneimine/trimethylolpropane trimethacrylate, which appears to be unique in this respect.

Cured carboxyl-containing polymers may be used in a variety of applications including sealants, potting compounds, coatings and casting compositions. One of the more well known uses is as a propellant binder for solid propellant rockets containing solid oxidizers such as ammonium perchlorate, potassium perchlorate and other solid oxidizers used in the propellant art. For this application, it is very important that the mechanical, and hence the ballistic properties, of the propellant compositions be stable over the wide range of temperature and humidity conditions normally encountered during prolonged storage. Due to the presence of solid particles in the solid propellant, the effects of temperature and humidity are greater than in a pure gum stock. This is because these solid particles tend to allow moisture to pass through the rubber more easily to produce a more rapid degradation of the cured polymer. Hence, the curing system of the present invention would be of particular value in propellant compositions using cured carboxyl-containing polymers as a binder.

The values for stress, strain, and modulus, given in the examples, were calculated from the usual load-elongation curve obtained using a testing machine having a controlled velocity of motion between the "fixed" and "moving" heads, and capable of indicating the total load carried by the specimen with sufficient accuracy to avoid the introduction of an error greater than 3% in the tensile stress. Strain (lb./in.$^2$) is measured at the point of maximum stress (percent) and the modulus (lb./in.$^2$) (stress/strain) is calculated from any point on the slope of the initial portion of the curve. A crosshead speed of 2.0 in./min. was used.

The tests were performed on ½ inch thick dumbbell-shaped specimens cut from a slab of cured propellant composition and having the following surface dimensions: necked-down center section—width, ½ in., length, 1 5/16 in.; end sections—width 1 in., length 1 1/32 in.; tapering intermediate sections—length ¾ in. The maximum total length of the specimen was 4 3/8 in.

Before testing, the cut specimens were allowed to age 3.0±0.5 hours including at least 2 hours at the test temperature of 25° C.±1° C. (77°±2° F.) and not more than 52% relative humidity. The dimensions of the necked-down section were measured to the nearest 0.004 in. (0.1 mm.) in order to calculate the cross-sectional area of the specimen.

The following examples illustrate the invention but are not intended to limit the scope thereof.

EXAMPLE 1

Carboxyl-terminated polybutadiene was prepared by the polymerization of butadiene using glutaric acid peroxide as an initiator as described in copending U.S. applications S.N. 140,585 filed Sept. 25, 1961, now U.S. Pat. No. 3,235,589.

Samples of this carboxyl-terminated polybutadiene gum stock were cured at 170° F. for 72 hours with (PI/TMPTMA)/MAPO using a series of ratios of the two curing agents at two different I/A ratios.

Stress relaxation data of the cured samples were then determined and the test results are shown in the table below. In the table, a higher tau value is indicative of greater stability of the cured polymer.

The tau value, in hours, is the relaxation time at which the stress required to keep a rubber sample extended has decreased to 37% of the original stress. It measures the chemical degradation of a polymer which degrades by a first order reaction. The data demonstrate that the combination of two curing agents when used as a curing system according to the present invention produces an unexpected substantial improvement over the use of either curing agent alone.

| (PI/TMPTMA)/ MAPO ratio | I/A ratio | Tau at 120° C. (248° F.) |
| --- | --- | --- |
| 100/0 | 1/1 | No stable cure. |
| 50/50 | 1/1 | 4.5 hours. |
| 40/60 | 1/1 | 3.6 hours. |
| 30/70 | 1/1 | 3.1 hours. |
| 20/80 | 1/1 | 3.1 hours. |
| 0/100 | 1/1 | 1.7 hours. |
| 100/0 | 1.25/1 | 1.35 hours. |
| 50/50 | 1.25/1 | 22.5 hours. |
| 40/60 | 1.25/1 | 16.5 hours. |
| 30/70 | 1.25/1 | 19.0 hours. |
| 0/100 | 1.25/1 | 6.0 hours. |

EXAMPLE 2

Heat aging of MAPO cured polymer based propellant

The following table shows the effect of aging at 200° on the mechanical properties of a propellant based on carboxyl-terminated polybutadiene (prepared as described in Example 1), containing 86% solids consisting of ammonium perchlorate and aluminum powder and cured at 135° F. for 144 hours with MAPO alone using an I/A ratio of 1/1. Degradation of the polymer is indicated by a decrease in stress and modulus values and an increase in strain values.

| Property of propellant when aged at 200° F. | Aging time (hours) | | | | | |
| --- | --- | --- | --- | --- | --- | --- |
| | 0 | 24 | 48 | 72 | 120 | 168 |
| Stress, p.s.i | 274 | 198 | 104 | 91 | 87 | 82 |
| Strain, in./in | .457 | .992 | .981 | .971 | 1.01 | 1.034 |
| Modulus, p.s.i | 926 | 397 | 252 | 342 | 302 | 258 |

EXAMPLE 3

Heat aging of MAPO/epoxide cured polymer based propellant

The following table shows the effort of aging at 200° F. on the mechanical properties of a propellant based on carboxyl-terminated polybutadiene (prepared as described in Example 1), containing 86% solids consisting of ammonium perchlorate and aluminum powder cured at 135° F. for 144 hours with a combination of MAPO and N,N-di(2,3 - epoxypropyl) - 4-(2,3-epoxy-1-propoxy)aniline using a mole ratio of 2.1 imine:1.0 epoxide and a mole ratio of curing agent to carboxyl groups of 1:1.

The increase in stress and modulus values and the decrease in strain values indicates a hardening of the resin produced by cross-linking due to the presence of the polyfunctional epoxide. This phenomenon continues long after the initial cure as indicated by the data.

| Property of propellant when aged at 200° F. | Aging time | | | | | |
| --- | --- | --- | --- | --- | --- | --- |
| | Initially | 1 wk. | 2 wks. | 1 mo. | 3 mos. | 6 mos. |
| Modulus, p.s.i | 600 | 506 | 638 | 902 | 2,264 | 2,535 |
| Stress, p.s.i | 110 | 113 | 126 | 147 | 160 | 140 |
| Strain, in./in | 0.26 | 0.32 | 0.33 | 0.31 | 0.15 | .09 |

EXAMPLE 4

Heat aging of MAPO/PI/TMPTMA) cured polymers based propellant

The following table shows the effect of aging at 200° F. on the mechanical properties of a propellant based on carboxyl-terminated polybutadiene (prepared as described in Example 1) containing 86% solids consisting of ammonium perchlorate and aluminum powder cured at 135° F. for 144 hours with a 50/50 mole ratio combination of MAPO and the propyleneimine adduct of trimethylolpropane trimethacrylate using an I/A ratio of 1/1.

| Property of propellant when aged at 200° F. | Aging time (hours) | | | | | | |
| --- | --- | --- | --- | --- | --- | --- | --- |
| | 0 | 24 | 48 | 72 | 120 | 168 | 216 |
| Stress, p.s.i | 261 | 258 | 278 | 285 | 268 | 271 | 254 |
| Strain, in./in | .488 | .451 | .491 | .467 | .464 | .463 | .453 |
| Modulus, p.s.i | 837 | 876 | 931 | 954 | 825 | 841 | 848 |

The fact that the mechanical properties remain nearly constant as compared to the values shown in Example 2 for a system cured with MAPO alone indicates the stabilizing effect of the use of a combination of the propyleneimine adduct of trimethylolpropane trimethacrylate with MAPO as a curing system.

EXAMPLE 5

Heat aging of propellant based on polymer cured with a mixture of MAPO and aziridine curing agents other than PI/TMPTMA The following table shows the effect of aging at 200° F. on the mechanical properties of a propellant based on carboxyl-terminated polybutadiene (prepared as described in Example 1), and containing 86% solids consisting of ammonium perchlorate and aluminum powder cured at 135° F. for 144 hours with a combination of MAPO and one of each of two trifunctional aziridine curing agents other than PI/TMPTMA. These propellant systems were compounded using a ratio of 30 parts by weight of carboxyl-terminated polybutadiene and 7.5 parts by weight of curing agent. The curing agents are designated as I, the propyleneimine adduct of 2,6-[2,3-epoxypropyl]phenyl glycidyl ether having the formula:

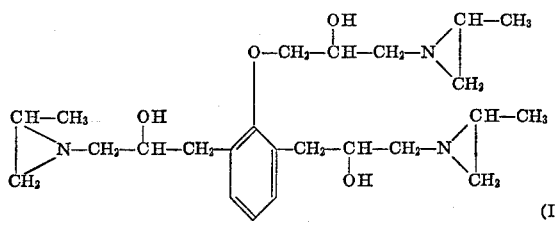

(I)

and II, the propyleneimine adduct of N,N-di(2,3-epoxypropyl)-4-(2,3-epoxypropoxy) aniline having the formula:

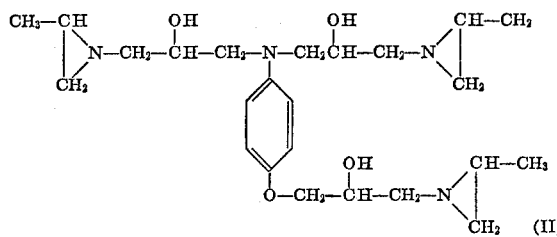

(II)

| | Aging time (hours) | | | | | |
|---|---|---|---|---|---|---|
| | 0 | 24 | 48 | 72 | 120 | 168 | 261 |
| Properties of propellant system cured with MAPO plus I after aging at 200° F.: | | | | | | |
| Stress, p.s.i | 168 | 36 | 25 | 22 | 26 | 33 | 40 |
| Strain, in./in | .519 | .778 | .990 | .976 | 1.070 | .815 | .810 |
| Modulus, p.s.i | 488 | 92 | 59 | 59 | 76 | 113 | 114 |
| Properties of propellant system cured with MAPO plus II after aging at 200° F.: | | | | | | |
| Stress, p.s.i | 144 | 28 | 19 | 17 | 21 | 30 | 40 |
| Strain, in./in | .624 | .881 | 1.150 | 1.280 | 1.130 | .955 | .80 |
| Modulus, p.s.i | 361 | 75 | 48 | 48 | 63 | 126 | 155 |

Both of these combinations were unsatisfactory as curing agents because of the extent of degradation of the polymer as shown by the lower stress and modulus values and the higher strain values after prolonged storage.

EXAMPLES 6-11

Effect of ratio variables

The following table illustrates the effect of varying the mole ratio of the propyleneimine adduct of trimethylolpropane trimethacrylate (PI/TMPTMA) to MAPO and varying the total I/A ratio on the Shore A Hardness of a propellant based on carboxyl-terminated polybutadiene (prepared as described in Example 1), containing 70% solids consisting of ammonium perchlorate and aluminum powder cured at 135° F. and heat aged at 200° F.

| Example Number | 6 | 7 | 8 | 9 | 10 | 11 |
|---|---|---|---|---|---|---|
| (PI/TMPTMA)/MAPO (mole ratio) | 50/50 | 50/50 | 100/0 | 100/0 | 70/30 | 0/100 |
| I/A ratio | 1/1 | 1.25/1.0 | 1/1 | 1.25/1.0 | 1/1 | 1/1 |
| Shore A hardness after curing at 135° F. for— | | | | | | |
| 24 hrs | Soft | 25 | 45 | 55 | 25 | Soft |
| 96 hrs | 40 | 55 | 35 | 45 | 35 | 60 |
| 120 hrs | 40 | 55 | 35 | 50 | 35 | 60 |
| 144 hrs | 40 | 55 | 35 | 50 | 35 | 60 |
| Shore A hardness after aging of the 144 hr. cured propellant at 200° F. for— | | | | | | |
| 24 hrs | 45 | 60 | Flows | 50 | 45 | 50 |
| 48 hrs | 40 | 55 | Flows | 63 | 45 | 35 |
| 120 hrs | 50 | 65 | Flows | 70 | 55 | Flows |
| 288 hrs | 50 | 65 | Flows | 70 | 60 | Flows |

A Shore A hardness of about 40 to 65 is generally acceptable for most propellant applications. Examples 6, 7, and 10 show that such acceptable values may be obtained by using various mole ratios of (PI/TMPTMA) to MAPO at various I/A ratios and that these remain acceptable after prolonged storage at 200° F. The use of 100% MAPO or (PI/TMPTMA) at an I/A ratio of 1/1 (Examples 11 and 8 respectively) produces a cured propellant which is unstable after being aged under similar conditions. On the contrary, the use of 100% (PI/TMPTMA) at an I/A ratio of 1.25/1.0 produces a cured propellant which becomes too hard after aging at 200° F. (Example 9).

I claim:

1. A curable composition of matter which comprises a carboxyl-containing polymer selected from the group consisting of carboxyl-containing hydrocarbon polymers, carboxyl-containing halocarbon polymers, carboxyl-containing polyester polymers, and carboxyl-containing polysulfide polymers in admixture with about $x$ moles of tris [1-(2-methyl)aziridinyl]phosphine oxide and about 100-$x$ moles of a compound having the structure

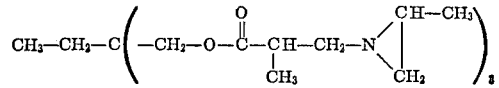

where $x$ is about 5 to 95, said composition of matter having a ratio of imine groups to carboxyl groups of about 0.75/1 to about 1.5/1.

2. A composition of matter as in claim 1 in which the carboxyl-containing polymer is carboxyl-containing polybutadiene.

3. A composition of matter as in claim 2 in which $x$ is about 50.

4. A composition of matter as in claim 3 in which the ratio of imine groups to carboxyl groups is about 1.25/1.

5. A process which comprises curing a carboxyl-containing polymer selected from the group consisting of carboxyl-containing hydrocarbon polymers, carboxyl-containing halocarbon polymers, carboxyl-containing polyester polymers, and carboxyl-containing polysulfide polymers with a curing agent system which comprises about $x$ moles of tris phosphine oxide and about 100-x moles of a compound having the structure

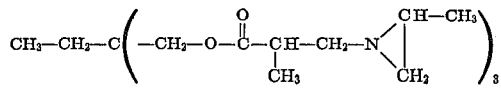

where x is about 5 to 95, said curing agent system being present in an amount to provide a mole ratio of imine groups to carboxyl groups of about 0.75/1 to about 1.5/1.

6. A process as in claim 5 in which the carboxyl-containing polymer is carboxyl-containing polybutadiene.

7. A process as in claim 6 in which x is about 50.

8. A process as in claim 7 in which the ratio of imine groups to carboxyl groups is about 1.25/1.

9. A cured composition obtained by curing the composition of claim 1.

References Cited
UNITED STATES PATENTS

| | | | |
|---|---|---|---|
| 3,153,639 | 10/1964 | Kraus et al. | 260—94.7 X |
| 3,155,552 | 11/1964 | Vriesen | 149—19 |
| 3,235,544 | 2/1966 | Christena et al. | 149—19 X |
| 3,354,116 | 11/1967 | Gruver et al. | 260—94.7 X |

LELAND A. SEBASTIAN, Primary Examiner

U.S. Cl. X.R.

149—19, 44; 260—78.4 R, 78.4 E, 79.1